R. W. GUNTER.
Middlings-Purifier.

No. 166,770.

Patented Aug. 17, 1875.

WITNESSES:
E. Wolff.
A. F. Ferry

INVENTOR:
R. W. Gunter
BY
ATTORNEYS.

UNITED STATES PATENT OFFICE.

RICHARD W. GUNTER, OF CARROLLTON, MISSOURI.

IMPROVEMENT IN MIDDLINGS-PURIFIERS.

Specification forming part of Letters Patent No. 166,770, dated August 17, 1875; application filed April 24, 1875.

*To all whom it may concern:*

Be it known that I, RICHARD W. GUNTER, of Carrollton, in the county of Carroll and State of Missouri, have invented a new and Improved Middlings-Purifier, of which the following is a specification:

The invention comprises a series of flat inclined laterally and longitudinally shaking sieves, placed one above another, a fan blowing into and through the space under each, to carry off the light matters, valves to regulate the blasts, and a conveyer under the bottom sieve, all contrived in a simple and efficient arrangement for obtaining a superior article of flour from middlings. The invention also comprises inclined close bottoms to the sieves, descending toward the fans to carry the middlings back, and having openings at certain intervals for discharging to the fans below, in front of which are wind-breakers to prevent the wind from blowing the middlings back up the bottoms.

Figure 1:
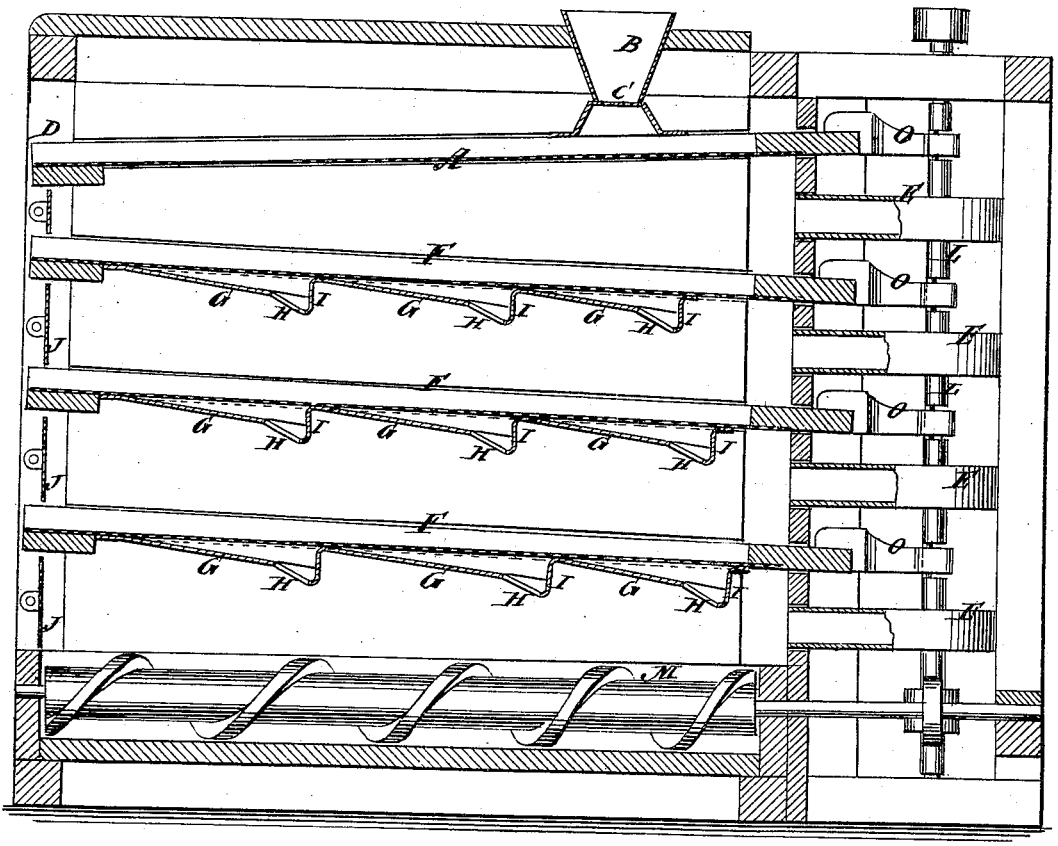
Figure 2:
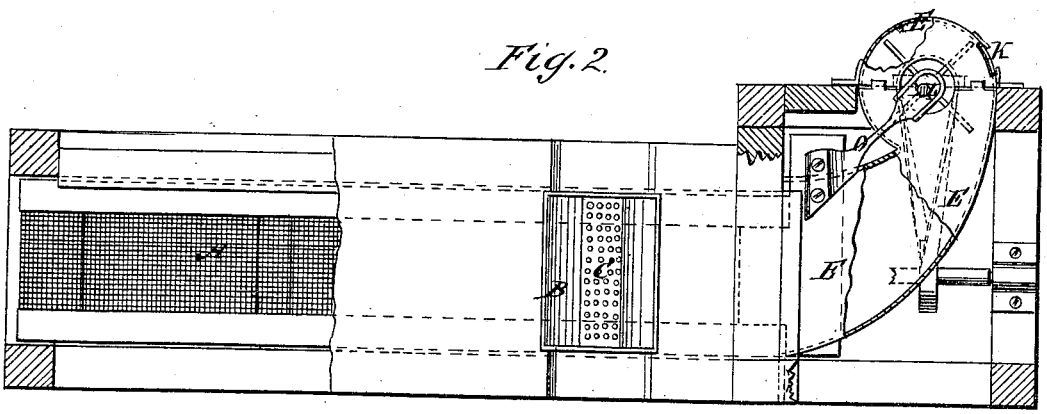

Figure 1 is a longitudinal sectional elevation of my improved middlings-purifier, and Fig. 2 is partly a plan-view and partly a horizontal section.

Similar letters of reference indicate corresponding parts.

A is an upper flat and slightly-inclined shaking sieve, receiving the middlings from the hopper B, having a perforated bottom, C, and discharging the coarse light matters at the passage D, toward which it descends from the fans E. The middlings fall through upon the upper sieve F of a series of three, which descend toward the fans, and also have a close bottom, G, for carrying the middlings back toward the fans, through which, at suitable intervals, are passages H, for discharging the middlings on the next sieve below, the passages being protected by the breakers I, so that the wind will not prevent them from escaping from the bottoms. At the tail end of each sieve is a valve, J, and in the side of each fan is a gate, K, to regulate the blasts. There is a fan for each sieve, and the fans are arranged on the same shaft L, to which the sieves are connected for being shaken. The conveyer M is also geared with this shaft, so that only one connection has to be made to the machine for driving. The fan-shaft is located at one side of the fan-case, and the sieves are connected to the cranks by rigidly-connected but elastic rods O, arranged oblique to the fans, so that they shake the sieves both laterally and longitudinally, and at the same time cause them to strike the edges against the case to answer for knockers to keep the sieves from clogging.

Having thus described my invention, I claim as new and desire to secure by Letters Patent—

1. The combination of the sieves A F, fans E, regulators J K, and cranked fan-shaft L, substantially as specified.

2. The combination of the inclined close bottoms G, having passages H and wind-breakers I, with the sieves F, substantially as specified.

RICHARD W. GUNTER.

Witnesses:
CHARLES A. SCOTT,
L. H. WATERS.